United States Patent [19]

Hashizume et al.

[11] Patent Number: 4,889,314

[45] Date of Patent: Dec. 26, 1989

[54] ELECTROMAGNETIC FLOW CONTROL VALVE FOR PRESSURE CONTROL OF THE LIKE

[75] Inventors: Yoshikazu Hashizume; Haruo Kamiya, both of Kanagawa, Japan

[73] Assignee: Atsugi Motor Parts Company, Limited, Kanagawa, Japan

[21] Appl. No.: 153,964

[22] Filed: Feb. 9, 1988

[30] Foreign Application Priority Data

Feb. 10, 1987 [JP] Japan .............................. 62-18161[U]

[51] Int. Cl.⁴ .............................................. F16K 31/06
[52] U.S. Cl. .............................. 251/129.02; 251/129.2; 251/129.16
[58] Field of Search ........... 251/129.2, 129.02, 129.16; 137/625.65

[56] References Cited

U.S. PATENT DOCUMENTS

| 2,335,311 | 11/1943 | Reisner | 251/129.2 X |
| 4,170,339 | 10/1979 | Ueda et al. | 251/129.2 |
| 4,205,593 | 6/1980 | Sakakibara | 251/129.2 X |

Primary Examiner—Arnold Rosenthal
Attorney, Agent, or Firm—Bachman & LaPointe

[57] ABSTRACT

A pivotal armature on which a resilient elastomeric body is mounted, is arranged to be engageable with first and second surfaces in a manner which limits its movement and which holds the armature in a first closed valve position wherein the elastomeric body is permitted to engage and close a valve port but prevented from undergoing excessive deformation and a second valve open position wherein the elastomeric body is moved just sufficiently to open the port.

7 Claims, 1 Drawing Sheet

ELECTROMAGNETIC FLOW CONTROL VALVE FOR PRESSURE CONTROL OF THE LIKE

BACKGROUND OF THE INVENTION

1. Field of the Invention

The present invention relates generally to electromagnetically operated valves and more specifically to an electromagnetic valve suited to use in vacuum or fluid flow control systems and the like.

2. Description of the Prior Art

A prior art valve disclosed in JP-A-58-172166 includes a yoke on which an armature is pivotally mounted, a solenoid or similar type selectively energizable electromagnetic device, and a spring which biases and holds the armature at a predetermined angle with respect to the yoke when the electromagnetic device is not energized. The arrangement further includes a valve body which is supported on the armature by way of the springy member. However, this arrangement has suffered from the following problems. As the springy member is disposed between the valve body and the armature, in order to move the valve body from an open position to one wherein it engages the port which it is is designed to close, and then further press the valve body against the port of the valve arrangement to the point that the port is hermetically closed, a relatively large amount of movement or stroke of the armature is necessary. Viz., it is necessary to move the valve body to the point where it actually contacts the valve port and then move an additionally amount in order to compress the spring member to the point that the required pressure is applied and the valve port is hermetically sealed.

Further, when the electromagnetic device is de-energized a predetermined amount of movement or stroke of the armature is necessary in order to reduce the compression in the springy member before the valve body is actually permitted to move away from the valve port. Thus, due to the need to compress and de-compress the springy member before the valve is completely closed or begins to open respectively, the opening and closing response characteristics of the valve is poor and reduces the precision with which the supply of vacuum or the like can be controlled.

With this arrangement, as the valve body serves as the reaction member which, in combination with the springy member, stops the movement of the armature toward the valve port, valve body tends to be subject to excessive wear which reduces the working life of the same.

SUMMARY OF THE INVENTION

It is an object of the present invention to provide a valve arrangement which exhibits good response characteristics and which improves the working life of the same.

In brief, the above object is achieved by an arrangement wherein a pivotal armature on which a resilient elatomeric body is mounted, is arranged to be engageable with first and second surfaces in a manner which limits its movement and which holds the armature in a first closed valve position wherein the elastomeric body is permitted to engage and close a valve port but prevented from undergoing excessive deformation and a second valve open position wherein the elastomeric body is moved just sufficiently to open the port.

More specifically the present invention comprises a valve which features: a first body in which a port is formed; an electromagnetic device mounted on the body; an armature, the armature being arranged to be movable toward and away from the port, the armature being arranged proximate the electromagnetic device and arranged to be moved in first direction when the eletromagnetic device is energized; a spring, the spring being connected with the armature in a manner to bias the armature in a second direction opposite the first direction; a second body connected to the armature, the second body being arranged to engage the port in manner to close the same when the armature is moved in one of the first and second directions; and a stopper arrangement, the stopper arrangement being arranged to limit the movement of the armature in the first and second directions.

BRIEF DESCRIPTION OF THE DRAWINGS

The attendant advantages and merits of the present invention will become more clearly understood from the following description taken in conjunction with the append drawings in which.

DETAILED DESCRIPTION OF THE PREFERRED EMBODIMENTS

Figure 1:
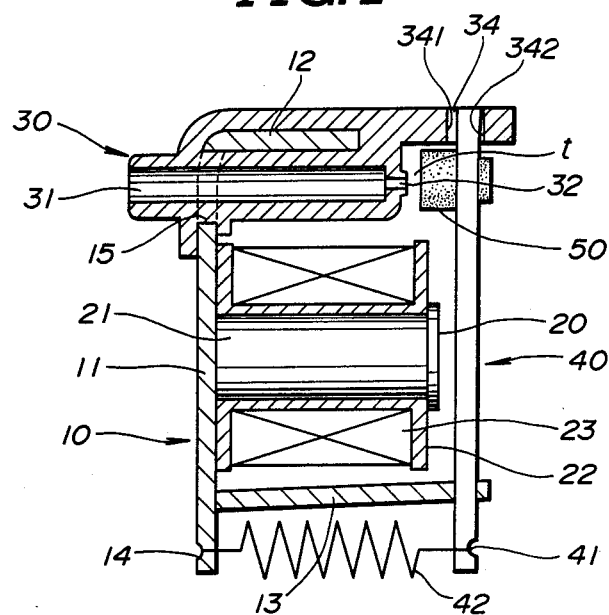
FIG. 1 is a sectional elevation of an embodiment of the present invention showing the valve arrangement according to the present invention in an open state.
Figure 2:
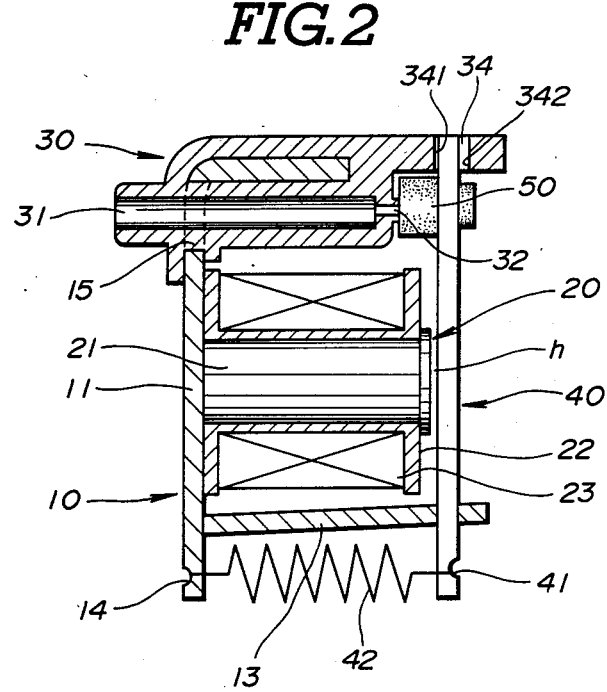
FIG. 2 is a sectional elevation similar to that shown in FIG. 1 which shows the valve arrangement in a closed state.

FIGS. 1 and 2 show an embodiment of the present invention. This arrangement includes a yoke 10 made of metal. The yoke includes a main body 11 and an integral connection section 12. The yoke further includes an armature support section 13 which is, as shown in the drawings, arranged to extend in essentially the same direction as the connection section 12. The lower end of the main body 11 is formed with a spring connection recess 14 at the lower end thereof (as seen in the drawings). The connection section 12 is formed with an aperture 15. The aperture facilitates the formation (via injection moulding or the like) of a section 30 of the valve in which a passage 31 and a port 32 are defined.

An electromagnetic device generally denoted by the numeral 20 is secured to the main section 11 of the yoke 10 at a location between the section 30 in which the passage 31 and port 32 are formed, and the armature support section 13. This device comprises a core 21 which is disposed within a bobbin 22. A coil 23 is wound on the bobbin and connected to a source of electrical energy by way of leads (not shown).

An armature 40 is pivotally mounted on the armature support section 13 by way of a suitable hinge arrangement or the like (not shown) and arranged to juxtapose the core 21 of the solenoid arrangement 20. The lower end of the armature 40 is formed with a spring connection recess 41. A tension spring 42 is connected between the connection recesses 14 and 41 in the illustrated manner. The spring 42 applies a bias which tends to rotate or pivot the armature toward its open position (see FIG. 1).

The upper end of the armature is received in a "stopper" opening 34 formed in section 30. The inboard and outboard edges 341, 342 of the opening 34 are arranged to act as stoppers which limit the movement of the armature toward and away from the body 30. A valve body or seal rubber 50 formed of rubber or similar elastomer and having a grommet-like configuration is disposed through an aperture (not shown) formed in the armature.

The upper end of the armature 40 is received in the opening 34 and supported at its lower end in a manner that, when it abuts the edge 341 the valve body 50 engages the port 32 with sufficient force to close the same (see FIG. 2). Alternatively, when it engages the edge 342, the valve body 50 is moved to a location with respect to the port 32 as to define a clearance "t" therebetween. This clearance "t" is selected to define a open position wherein unrestricted fluid flow through the port is rendered possible (see FIG. 1) and to keep the stroke of the armature as small as practical.

The position of the opening 34 and width between the edges 341 and 342 is selected in combination with the dimensions of the seal rubber which defines the valve body 50, such that when the electromagnetic device 20 is energized and the armature is attracted against the force of the spring 42, the seal rubber will be permitted engage the port 32 with sufficient force as to deform and close the same and to provide a good seal while not being subject to excessive pressure and/or deformation which reduces the working life of the element. Viz., the amount by which the armature 40 is permitted to approach the port 32 is limited in manner that it engages the edge 341 essentially at the same time as the valve assumes a closed state.

By forming the port and the opening 34 in the same member it is possible to control the distance between the two accurately and thus accurately control the open and closed valve positions. This facilitates good operational charactertistics and mass production.

The spring 42 is selected in a manner to ensure that when the electromagnetic device 20 is de-energized the armature will be moved at essentially the same time to the position illustrated in FIG. 1 wherein the valve assumes a "open" position and the above mentioned clearance "t" is established between the face of the valve body and the port 32. The strength of the spring 42 should also be selected to be adequate to provide the above mentioned function without offering excessive resistance which induces the need for large amounts of current to be passed through the coil 23. The clearance "t" is small and arranged so that upon energization of the electromagnetic device the port 32 can be closed essentially instantaneously. Proper selection of the clearance "t" and the strength of the spring ensure the valve exhibits good opening and closing response characteristics. Further, with the illustrated embodiment it is possible to arrange the core 21 and the armature in a manner that the clearance "h" therebetween is such that electromagnetic hysteresis is reduced. Moreover, if a high frequency signal is used the response of the device increases proportionally thus providing a further improvement in control characteristics.

It should be noted at this point that it is possible to use the above disclosed arrangement in systems wherein the passage 31 is communicated with a source of vacuum and the port 32 arranged to open into a chamber into which the vacuum is to introduced. Alternatively, it is possible to arrange for the passage 31 to communicate with a vacuum powered actuator and for the port to open into a chamber which defines part of the vacuum supply or a chamber communicated with the atmospheric atmosphere. The various other possible applications for the instant valve arrangement will be clear to those skilled in the art to which it pertains and as such no further discussion will be given for brevity.

It will be also noted that the present invention is not limited to the illustrated arrangement and that a number of variations are possible without departing from the scope of the invention. For example, the present invention is not limited to controlling vacuum supplies and may use with positive pressure systems with equal effect.

In the illustrated arrangement the armature stopper arrangement and the structure defining the port are formed integrally. However, it is possible to form the parts separately and connect the same with screws, bond, solvent or electrical welding or the like. Further, while the yoke can be formed integrally with the body in which the port and armature stopper arrangement are defined, in manner which facilitates accurate production, it is also possible to form this member separately connect the same in the above mentioned manner.

As the various other modifications which are possible will be obvious to those skilled in the art to which the present invention pertains, no further disclosure will be given for clarity.

What is claimed is:

1. A valve comprising:
   a first body in which a port is formed;
   an electromagnetic device mounted on said body;
   an armature, said armature being arranged to be movable toward and away from said port, said armature being proximate said electromagnetic device and arranged to move in a first direction when said electromagnetic device is energized;
   a spring, said spring being connected with said armature in a manner to bias said armature in a second direction opposite said first direction;
   a second body connected to said armature, said second body being arranged to engage said port in a manner to close the same when said armature is moved in one of said first and second directions; and
   a stopper arrangement arranged to limit the movement of said armature in said first and second directions, said stopper arrangement comprises an aperture formed in a member extending from said first body, said aperture having first and second opposed edges, said armature being received in said aperture in a manner that when said electromagnetic device is energized and moves in said first direction said armature moves toward and engages said first edge, and when said electromagnetic device is de-energized said spring moves said armature in said second direction toward and into engagement with said second edge.

2. A valve as claimed in claim 1 wherein said second body comprises an elastomeric member which is resiliently deformable, said body being arranged to come into contact with said port and deform sufficiently to close said port when said armature engages one of said first and second edges, said body being arranged to define a predetermined clearance between said port and the section of the second body engageable with said port, when said armature engages the other of said first and second edges.

3. A valve as claimed in claim 1 further comprising a yoke, said yoke being connected to said first body and arranged to support said electromagnetic device.

4. A valve as claimed in claim 3 further comprising an armature support member, said armature support member being connected to said yoke and arranged to pivotally support said armature.

5. A valve as claimed in claim 4 wherein said spring is connected between said yoke and said armature, said yoke and said armature being formed with spring connection sites respectively.

6. A valve as claimed in claim 5 wherein said armature support member is arranged between said spring and said first body.

7. A valve as claimed in claim 6 wherein said electromagnetic device is disposed between said armature support member and said first body.

* * * * *